July 24, 1962 R. DI SABATINO 3,046,022

AUTOMATIC PHONOGRAPH RECORD PLAYER

Filed Sept. 14, 1959 7 Sheets-Sheet 1

INVENTOR.
ROLAND DI SABATINO
BY
Eugene M. Whitacre
ATTORNEY

July 24, 1962 R. DI SABATINO 3,046,022

AUTOMATIC PHONOGRAPH RECORD PLAYER

Filed Sept. 14, 1959 7 Sheets-Sheet 2

INVENTOR.

ROLAND DI SABATINO

BY Eugene M. Whitmore

ATTORNEY

INVENTOR.
ROLAND DISABATINO
BY
Eugene M. Whitacre
ATTORNEY

July 24, 1962 R. DI SABATINO 3,046,022

AUTOMATIC PHONOGRAPH RECORD PLAYER

Filed Sept. 14, 1959 7 Sheets-Sheet 4

INVENTOR.
ROLAND DI SABATINO
BY Eugene M. Whitacre
ATTORNEY

July 24, 1962 R. DI SABATINO 3,046,022

AUTOMATIC PHONOGRAPH RECORD PLAYER

Filed Sept. 14, 1959 7 Sheets-Sheet 5

INVENTOR.

ROLAND DI SABANTINO

BY Eugene M. Whitacre

ATTORNEY

July 24, 1962 R. DI SABATINO 3,046,022

AUTOMATIC PHONOGRAPH RECORD PLAYER

Filed Sept. 14, 1959 7 Sheets-Sheet 6

INVENTOR.
ROLAND DI SABATINO
BY Eugene M. Whitmore
ATTORNEY

July 24, 1962 R. DI SABATINO 3,046,022

AUTOMATIC PHONOGRAPH RECORD PLAYER

Filed Sept. 14, 1959 7 Sheets-Sheet 7

INVENTOR.
ROLAND DI SABATINO
BY
Eugene M. Whitacre
ATTORNEY

United States Patent Office
3,046,022
Patented July 24, 1962

3,046,022

AUTOMATIC PHONOGRAPH RECORD PLAYER

Roland Di Sabatino, Oaklyn, N.J., assignor to Radio Corporation of America, a corporation of Delaware Filed Sept. 14, 1959, Ser. No. 839,700
3 Claims. (Cl. 274—10)

This invention relates to automatic phonograph playing mechanisms of the type known generally as automatic record changers. Such record changers, as is well known, include motor-driven record turntable means, tone arm means provided with a transducer or pickup device havinng an operating stylus for engaging a record groove, and record handling means operatively associated and coordinated to automatically reproduce the recordings on flat disc phonograph records in predetermined sequence.

It is an object of this invention to provide an improved automatic phonograph record changer.

A further object of this invention is to provide an improved automatic record playing mechanism wherein the loading and removal of records from the record playing mechanism is greatly simplified so that the mechanism is particularly well adapted for vehicular use.

An automatic record playing mechanism in accordance with the invention is inverted from the position of known types of record changers in that a rotatable spindle which supports a stack of records to be played extends downwardly from the driving and controlling mechanism and records are loaded thereon from the bottom. The spindle includes record supporting and separating means for retaining the records thereon in a manner that the lowerside of the bottom-most record is exposed for engagement by the stylus of the pickup carried by a tone arm. After a record is played, it is dropped from the spindle to receptacle directly beneath the spindle. If desired, the receptacle may comprise a portion of the record player cabinet. The receptacle may be provided with abutments which serve as record guides so that a stack of records may be inserted using only one hand, with the guides serving to stop the records when the center holes thereof are in alignment with the record changer spindle. The records are then moved upwardly and threaded onto the spindle to a position directly above the supporting means. This construction offers the distinct advantage of facilitating the record loading operation in that the user may load a stack of records onto the spindle with one hand, without having to be able to see the spindle. Furthermore, the unloading operation is completely eliminated in that after playing, the records are dropped into the receptacle from which they may be conveniently withdrawn.

A feature of the invention is that a manually operable control element is provided at the bottom end of the spindle for retracting the record supporting means so that records supported on the spindle may be quickly and conveniently released into the user's hand.

In accordance with a further feature of the invention, means are provided to disable the actuation of the record supporting and separating means of the spindle during the cycling of the automatic mechanism so that a lowermost record will not be dropped from the spindle into the receptacle. It should be noted that after a stack of records has been placed on the spindle, the automatic record changing mechanism is actuated to go through a cycle of operation to cause the tone arm to move to a position so that the pickup stylus engages the lead-in groove of the bottom-most record. Since this mechanism also controls the record supporting and separating means contained in the spindle, the first record would ordinarily be caused to drop from the spindle without being played. However, in accordance with the invention, the automatic record changing mechanism can be selectively conditioned to go through a cycle of operation without dropping the first record before it is played, or if desired, to repeat the playing of a selected record.

The automatic record changing mechanism of the invention is particularly adapted for vehicular use, since the operator of the vehicle can perform the function of loading records on the spindle without removing his eyes from the road. A record playing mechanism used in the vehicle, such as an automobile, is subject to vibration and acceleration type forces not ordinarily encountered in the ordinary use of such apparatus. Accordingly, another feature of the invention is in the supporting of a phonograph record changing mechanism intended for vehicular use. The supporting means include strategically located spring and air cushions to damp the effect of vertical vibrations and other forces due to acceleration and deceleration or centrifugal forces caused by changes in the direction of the vehicle.

Another feature of the invention resides in the balancing of the tone arm in a vertical plane by suitable counterweights so that the particular position of the mechanism with respect to horizontal does not affect its operation. Furthermore, the entire tone arm system including the tone arm shaft or levers which may be attached thereto are balanced in a horizontal plane by the proportioning and distribution of the weights of the various elements of the system so that the tone arm is substantially unaffected by the above-mentioned forces.

Still another feature of the invention resides in the balancing of the record changing mechanism tripping elements, such as the driving cam, to prevent the forces on the mechanism from inadvertently causing a tripping of the record changing mechanism.

The novel features which are considered to be characteristic of this invention are set forth with particularity in the appended claims. The invention itself, however, both as to its organization and method of operation, as well as additional objects and advantages thereof, will best be understood from the following description when read in connection with the accompanying drawings; in which:

Figure 1:
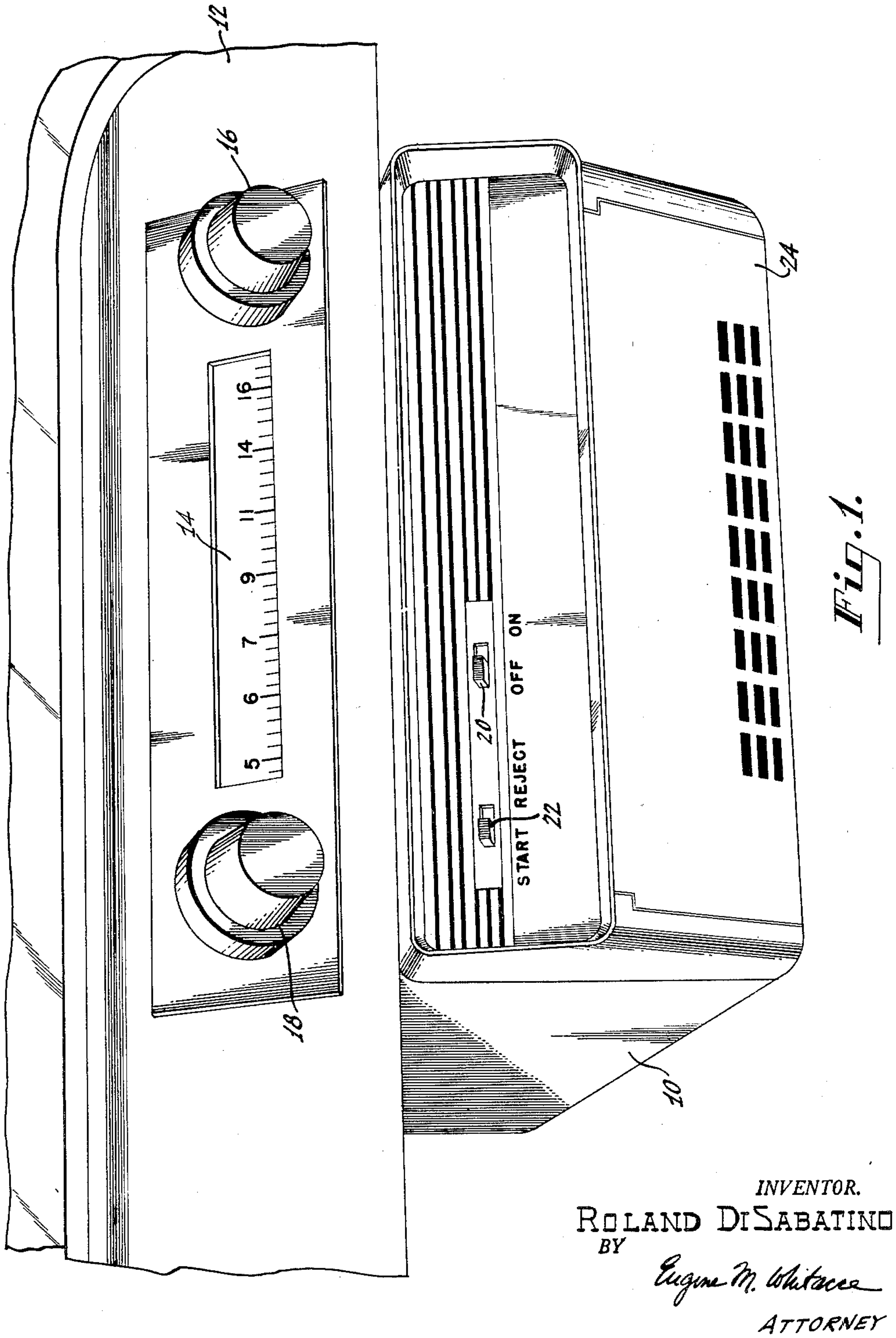
FIGURE 1 is a perspective view of a cabinet enclosing an automatic record playing mechanism embodying the invention, mounted beneath the dashboard of an automobile.

Referring now to the drawings wherein like reference numerals will be used to indicate similar components throughout, and particularly to FIGURE 1, the automatic record playing mechanism of the invention is enclosed in a casing 10 which may be mounted beneath the dashboard 12 of an automobile. A tuning dial 14 of an automobile radio receiver is mounted in the dashboard 12, and includes a tuning control knob 16 and a volume control knob 18 disposed at opposite sides of the tuning dial 14. Electrical signals derived from a record played by the record playing mechanism of the invention are conveyed through a suitable cable 19, FIGURE 10, to the audio frequency amplifying portion of the automobile receiver for amplification thereby before being applied to the receiver loudspeaker system.

An on-off switch 20 is provided on the front panel of the casing 10 for controlling the application of power to the mechanism. As will be described more fully in connection with FIGURE 10, the switch 20 is also adapted to control the signal current path between the record player and radio. In the "Off" position, the radio is connected to transduce received radio signals in the usual manner, and in the "On" position, the signal circuit in the receiver is opened and the record player is connected to apply audio frequency signals to the receiver audio amplifier. A start-reject switch 22 is also provided on the front panel of the casing 10 for selectively controlling the operation of the automatic record playing mechanism of the invention. If the switch 22 is moved to the "Reject" position, the automatic record playing mechanism is actuated, and record supporting and selecting means in the record changer spindle are operated to discharge the lowermost record from the spindle. Movement of the switch 22 to the "Start" position actuates the automatic record playing mechanism, but conditions the mechanism to prevent operation the record supporting and selecting means so that the lowermost record will not be dropped.

Although the automatic record playing mechanism of the invention is described in connection with vehicular use, it will be understood that the concepts of the invention are equally applicable for use in other record player applications, such as in the home.

Figure 2:
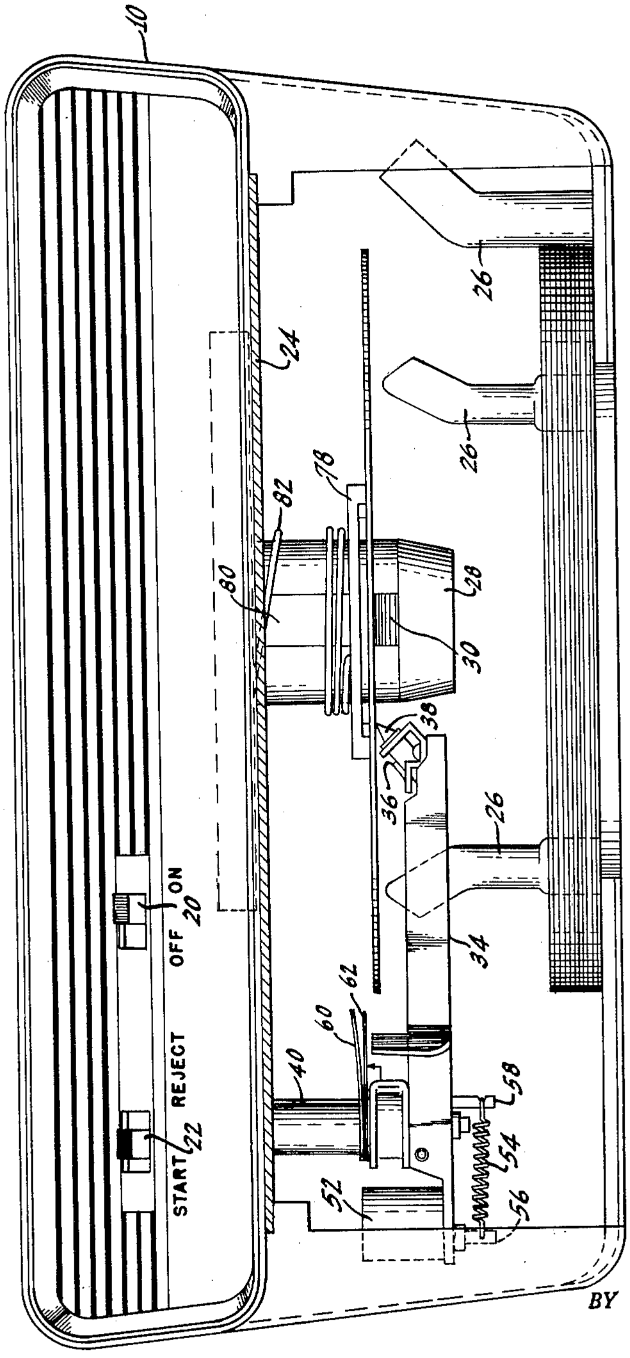
FIGURE 2 is a front view of the cabinet shown in FIGURE 1 with the door thereof in the open position, showing the automatic record playing mechanism of the invention in a record playing cycle.

FIGURE 2 shows the automatic record playing mechanism as viewed from the front of the casing 10 with the door 24 thereof in the open position. The door 24 is provided with a spring member not shown which is mounted in a manner to hold the door in a closed position or in the open position as shown. A series of guide abutments 26 are mounted on the bottom wall or floor of the casing 10 and extend upwardly therefrom to assist in the loading of records to be played. A stack of records may be grasped in one hand and inserted in the opening until the periphery of the stack engages the guide abutments 26. A portion of the floor of the casing 10 is cut away so that the operator's hand may enter the casing without difficulty. When the stack of records, which in the present case are 7 inch records having one and one half inch centerholes engages the guide abutments 26, the centerholes thereof are in alignment with a rotatable spindle 28 which extends downwardly from the upper portion of the casing. The records are then raised by the operator and threaded onto the spindle 28 to a point above a pair of oppositely disposed retractable record supporting shelves 30. The record supporting shelves have cam surfaces 32, which facilitate the loading of records onto the spindle 28.

A tone arm 34 carries a suitable sound-reproducing or phonograph pickup device 36 at the free end thereof. The pickup device is provided with a suitable stylus 38 for engaging the sound groove on the bottom side of the lowermost record supported on the spindle 28. The opposite end of the tone arm 34 is mounted on a tone arm post 40, which depends from the underside of a motorboard 46. After a record has been played, the automatic record playing mechanism causes the shelves 30 to retract, and a pair of record separating blades 42 (see FIGURES 8 and 9) to extend from the spindle so that the lowermost record drops by force of gravity into a receptacle provided by the guide abutments 26 and the floor of the casing 10. After the last record has been played, the stack of records can be conveniently removed from the casing without having to touch any portion of the record playing mechanism.

With reference to FIGURES 3 to 9, a hollow shaft 44 extends through the tone arm post 40 to a position above the motorboard 46 to mechanically couple the tone arm 34 and a trip lever assembly plate 48, thus providing for horizontal rotation of the tone arm 34 with the trip lever assembly plate 48 about the tone arm post 40. The tone arm is provided with a vertical depressing rod 50 located within the hollow shaft 44 and extending above the trip lever assembly plate 48. The tone arm 34 is balanced in a vertical plane by a counter-balance weight 52 mounted at the end of the tone arm opposite the pickup device 36. A spring 54 which is connected between a stud 56 on the remote end of the tone arm and a finger 58 which projects upwardly through a suitable aperture in the tone arm, provides the desired stylus tracking pressure and biases the tone arm upwardly against a record supported on the spindle 28. For vehicular use a pressure of about 10 grams was found to provide good performance in the particular 45 RPM record changing mechanism shown and described.

The tone arm is also balanced in a horizontal plane by shaping the trip lever plate 48, and positioning this plate to provide the desired distribution of weight.

The record changer chassis is supported in the cabinet 10 by strategically located spring and air cushions 41, 43 and 45. The air cushions are resilient balloon-like members which provide a closed chamber having an end plate with an aperture of a size to provide the necessary damping. Enclosed within the balloon-like members are springs which complete the mechanical connection from the cabinet 10 to the motorboard 46. The combination of the damped mounting means located as shown, and the balanced tone arm, provides a record player which is virtually unaffected by the vibrations and forces to which the apparatus is subjected in vehicular use.

The tone arm is also provided with a travel limiting member 60 which is adapted to abut against the contacts of a switch 62 when the tone arm is in its uppermost position. The switch 62 is mounted on the hollow shaft 44 for rotation therewith, so that the contacts thereof will at all times be disposed directly above the free end of the travel limiting member 60. When the tone arm pickup engages a record is supported on the spindle 28, the travel limiting member 60 will not engage the switch. However, after the last record has been played and is discharged into the receptacle mentioned above, the spring 54 biases the tone arm toward its uppermost position and causes the travel limiting member 60 to engage the switch 62 to open the contacts thereof. As will be explained hereinafter, this operation provides a simple and convenient automatic means for turning off the record playing mechanism of the invention after the last record has been played.

The record playing mechanism of the invention includes a spindle driving pulley 64 which is rotatably supported by the motorboard 46. An electric motor 66, which in the present instance is adapted to be operated from a direct current source, such as an automobile battery has a motor spindle 68 which engages a rubber tire idler wheel 70. The idler wheel 70 is pivotally mounted and biased toward the motor spindle 68 and the edge of the spindle driving pulley 64. The speed of the motor, and the relative dimensions of the motor spindle, idler wheel, and spindle driving pulley are selected to effect the rotation of the turntable at a desired speed such as at a rate of 45 revolutions per minute (r.p.m.).

Suitably bracketed to the top of the motorboard 46 is a U-shaed guide member 84. Record changing cycle control means such as a record change cycle or reciprocating control slide 86 is mounted, as indicated, for slidable movement between the arms of the guide member 84. A control slide return spring 85 is connected between the guide member 84 and a lug on the cycling slide. The control slide 86 is provided with suitable means, such as a cam 88 eccentrically mounted thereon for causing reciprocal sliding movement thereof. The cam 88 is suitably counterbalanced in a horizontal plane even though eccentrically mounted so as to be substantially immune to undesired movement by acceleration or deceleration forces or movement of the mechanism from a level position. This is of importance where the record playing mechanism is used in a vehicle to prevent erroneous actuation of the record changing cycle mechanism. The periphery of the cam 88 is serrated, and a portion thereof is mutilated, or cut-out for non-contacting registry with a rubber bushing 90 during a record playing cycle.

A stud 94 on the cam 88 is positioned in the path of a resilient trip lever 92 carried by the trip lever assembly plate. The trip lever plate 48 rotataes with the tone arm, so that after a record has been played, the trip lever is brought into contact with the stud 94 urging the cam 88 to rotatae into engagement with the rubber bushing 90. This action initiates the reciprocal sliding movement of the control slide 86. Alternatively, the cam 88 can be moved into engagement with the rubber bushing 90 by causing an electromagnet 91 to be energized. This produces a magnetic field that attracts a small block of soft iron 93 mounted on the cam 88.

The end of the vertical elevating rod 50 rests on the tone arm height adjustment screw 86 during the playing of a record. A depressed portion 96 pressed into the slide is so located that the elevating rod 50 will be forced downwardly when the control slide 86 moves in the direction of the elevating rod 50 thereby to cause the tone arm 34 to move away from the lowermost record.

A stud 98 on the trip lever assembly plate 48 projects upwardly into the path of the control slide 86. As the control slide 86 moves outwardly, or to the left as viewed in FIGURES 3, 4 and 5, an abutment 100 thereon engages the stud 98 causing pivotal movement of the trip lever plate 48 and the lowered tone arm 34 about the tone arm post 40 to a position as shown in FIGURE 5.

To provide a tone arm positioning or indexing system a tone arm landing latch and return lever 102 is mounted behind the tone arm post 40. The tone arm return lever 102 is mounted for rotational movement on a stud 106 which is suitably affixed to the motorboard 46.

The tone arm return lever 102 is biased for counterclockwise rotation by a spring 108 which is connected between a lug 110 on the tone arm return lever 102 adjacent the pivot thereof, and a pin 112 secured to the motorboard 46. During the normal playing of a record an unlatching or releasing means comprising a downwardly projecting unlatching or releasing stud 114 on the control slide 86 engages an outwardly extending lug 116 on the tone arm return lever to hold the lever 102 in a standby position.

The tone arm return lever 102 comprises two forked arms 118 and 120. The inner arm 118 is of such length that it will strike the tone arm post 40 to limit the inward movement of the tone arm return lever 102 when the control slide 86 moves to permit the unlatching stud 114 to disengage the lug 116 and thereby permit the tone arm return lever 102 to rotate inwardly under the influence of the spring 108. Excessive outward rotation of the tone arm return lever is prevented by virtue of the location of the pin 112, which is in the path of the outer arm 120.

A short distance along the inner edge from the free end of the outer arm 120 is a notched portion 124. A tone arm landing adjustment stud 126 projecting downwardly from the trip lever assembly plate 48 is so located that when the trip lever assembly plate is rotated outwardly by the slide 86, as hereinbefore described, the landing adjustment stud will engage the inner edge of the outer arm 120 at the free end thereof to impart outward rotational movement to the tone arm lever 102. As such outward rotation progresses, the landing stud 126 slips behind the notched portion 124 and rides the inner edge of the outer arm 120 toward the pivot of the tone arm return pivot 102.

When the tone arm reaches its outermost position the record changing means above mentioned separates the lowermost record of the stack of records supported on the spindle 28 and permits it to drop from the spindle 28 to the receptacle formed in part by the casing 10. After this is accomplished, the slide continues its return movement to the influence of the cam 88.

When the control slide 86 starts its return movement the abutment 100 releases the trip lever stud 98 and the outer arm 120 of the tone arm return lever 102 in bearing against the landing adjustment stud 126 urges the trip lever assembly plate 48, and consequently the tone arm 34, inwardly until the landing adjustment stud 126 reaches and is received in the notched portion 124 of the outer arm 120 of the tone arm return lever 102. This latches the trip lever assembly plate 48 and hence the tone arm prevented from further inward rotational movement. At the point of latching the landing adjustment stud 126 in the notched portion 124, the stylus 38 of the tone arm is in the correct position beneath the outermost groove (lead-in groove) of a record to be played.

As the control slide 86 completes its return movement, the depressing rod 50 rides off the ramp portion 96 on the control slide, whereupon the tone arm 34 rises to permit the stylus 38 to engage the lead-in groove of the lowermost record supported on the spindle 28. The latch release stud 114 on the control slide 86 then engages the outwardly extending lug 116 on the tone arm return lever, and further movement of the control slide to the initial position thereof effects the unlatching of the landing adjustment stud 126. The tone arm is free to move as the stylus engages the record groove to free the selection in a record playing cycle.

The separation of the lowermost record from the rest of the stack is effected by record changing means or record selecting or separating apparatus comprising record shelves 30, and a pair of thin blades or record separators 42 housed in the spindle 28. The shelves 30 are positioned to normally extend from opposite sides of the spindle 28, and the record separators 42 are positioned respectively above the shelves and are normally retracted within the spindle body. The shelves 30 are provided with thrust springs 71 therebetween which constantly urge the shelves 30 apart. Each of the record separators 42 is provided with a fingerlike extension which extends between the oppositely disposed separator and the shelf thereunder. A depending member 73 on the end of each of the fingerlike extensions is bent downwardly to fit a recess provided in the top of the shelves.

The shelves 30 and blades 42 cooperate with a shaft 72 extending down the central axis of the spindle. The shaft 72 has a flattened cam portion 75 formed at the lower end thereof. This cam portion is in registry with tabs 77 struck up from the blades 42. During the normal playing of a record the shaft 72 rotates with the spindle, and the springs 71 urge the shelves outwardly thereby keeping the record separating blade retracted due to the action of the depending members 73. Upon the stopping of the shaft 72 relative to the spindle during record changing operations, cam 75 bears against the tabs 77 forcing the blades out of the spindle body beneath the next-to-lowermost record. In the process, the depending members 73 of each blade pulls the opposite shelf 30 into the spindle to permit the lowermost record of the stack to drop from the spindle into the aforementioned receptacle.

The spindle is also provided with a manually operable record release knob 79 at the bottom end of the spindle 28. Rotation of the record release knob 79 retracts the record support shelves so that all of the records supported by the spindle may be dropped therefrom into the hand of a person rotating the knob 74. This provides a simple and effective method for removing unplayed records from the spindle 28. To effect this release a pair of short blades 81 are provided which are similar in construction to the record separating blades 42 with the exception that the blades 81 are made short enough so that they never extend from the spindle body. Each of the blades 81 has a depending member which fits into a recess formed in the shelves 30 so that upon rotation of the knob 74 a cam 83 at the top thereof engages tabs 85 on the blades 77 to cause the blades to pull the shelves 30 into the spindle body. The retraction of the shelves 30 into the spindle body does not affect the blades 42 because of the clearance of the recesses into which the depending members 73 extend.

To prevent slippage of records supported on the shelves 30, a spring biased pressure plate 76 is mounted on the spindle 28 and is provided with a key 78 which engages a slot 80 in the side of the spindle. A spring 82 provides sufficient biasing to cause the pressure plate to urge records on the spindle against the shelves 30 to prevent record slippage or tilting.

The mechanism for stopping the shaft 72 relative to the spindle 28 during the record changing operation in the manner explained above, includes a serrated clutch disc or fine-toothed ratchet wheel 130 which is mounted on the shaft 72, and is held in frictional contact therewith by means of a friction collar 132. The frictional coupling of the ratchet wheel 130 to the shaft 72 prevents damage to the record changing mechanism should the separators 42 jam during a record changing operation. The control slide 86 is provided with a stopdog member or detent 134 near one end thereof which projects upwardly past the toothed ratchet wheel 130 and is adapted to engage a serrature or tooth in the ratchet wheel at the appropriate moment to stop the roation of he shatf 72 and thereby cause the record changing apparatus in the spindle 28 to operate.

To prevent damage to the teeth of the ratchet wheel 130 the detent 134 is resiliently mounted on the control slide 86. In one arrangement, the stopdog is an L shaped member having upwardly extending leg 136 pivotally mounted on top of the control slide 86 at 140. A spring 142 is connected between one leg of the L shaped member 138 and a lug 146 on the control slide 86. This arrangement prevents chipping of the serratures or teeth of the ratchet wheel 130 as the stopdog 134 moves into engagement with the ratchet wheel to stop the wheel and the shaft 72.

After the record changing apparatus is operated to permit a record to drop to the receptacle, as hereinbefore described, the control slide 86 under the combined influence of the cam 88 and the control slide return spring 85, is cammed back to its between cycles positions. When this return movement begins the detent 134 disengages the tooth ratchet wheel 130 and permits such ratchet wheel and the shaft 72 to resume rotation with the spindle 28. The return movement of the control slide 86 is completed when the cutoff portion of the cam 88 again is concentric with the rubber bushing 90.

Figures 6, 7, 8, 9:
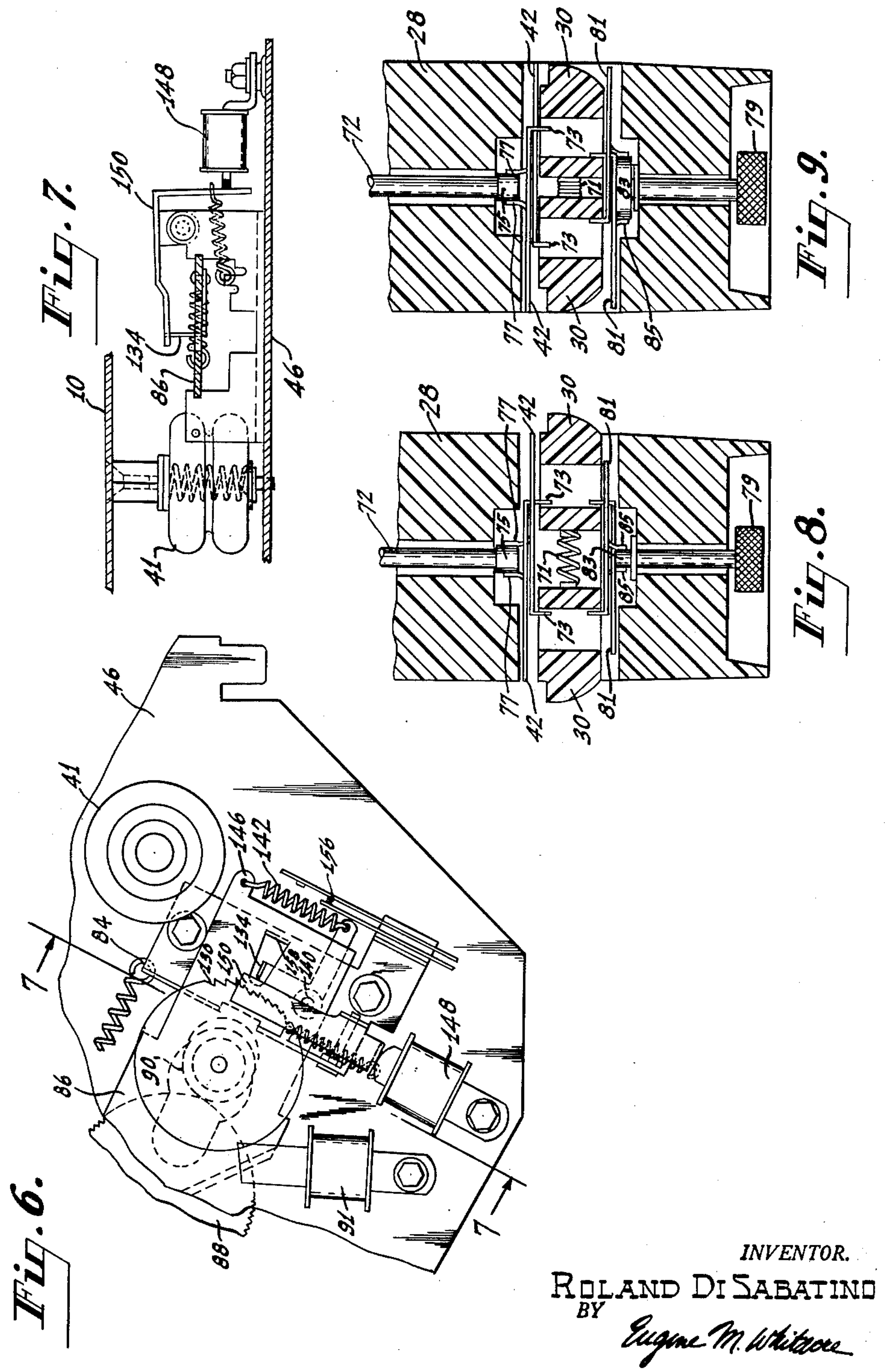
FIGURE 6 is a plan view of a portion of the record playing mechanism of the invention showing the positioning of the parts thereof during a cycle of operation when the actuation of the record supporting and selecting elements in the spindle is disabled.
FIGURE 7 is a sectional view taken on the section lines 7—7 in FIGURE 6.
FIGURE 8 is a sectional view of the spindle mechanism showing the positioning of the parts thereof during the record playing cycle.
FIGURE 9 is a sectional view of the spindle mechanism showing the relative position of the parts thereof during a record changing cycle.

After a stack of records has been loaded onto the spindle 28, it is desirable that the lowermost record of the stack be played before being discharged into the receptacle. Furthermore, it may be desirable to repeat a playing of a given record. In either case, the automatic record changing mechanism in the spindle 28 must not be operated. In accordance with the invention, the tone arm controlling portions of the mechanism may be operated without affecting the mechanism in the spindle. To accomplish this, an electromagnet 148 is energized to cause a lever 150 to move into the path of the detent 134. The lever 150 which is generally of a L-shaped configuration includes a first leg which extends past the pole of the electromagnet 148. A second leg of the lever 150 extends over the ratchet wheel 130 and is positioned such that the detent 134 ordinarily passes therebeneath. However, when the electromagnet 148 is energized, as shown in FIGURE 7, the lever 150 is pivoted in a direction such that the second leg thereof moves downwardly and into the path of the detent 134. This prevents the detent 134 from engaging the teeth on the ratchet wheel and thereby prevents stopping the shaft 72. Since the shaft 72 is not stopped the shelves and blades housed within the spindle 28 are not operated to release the lowermost record to the receptacle in the record player cabinet, yet the tone arm controlling mechanism is operated in the usual manner.

Figure 3:
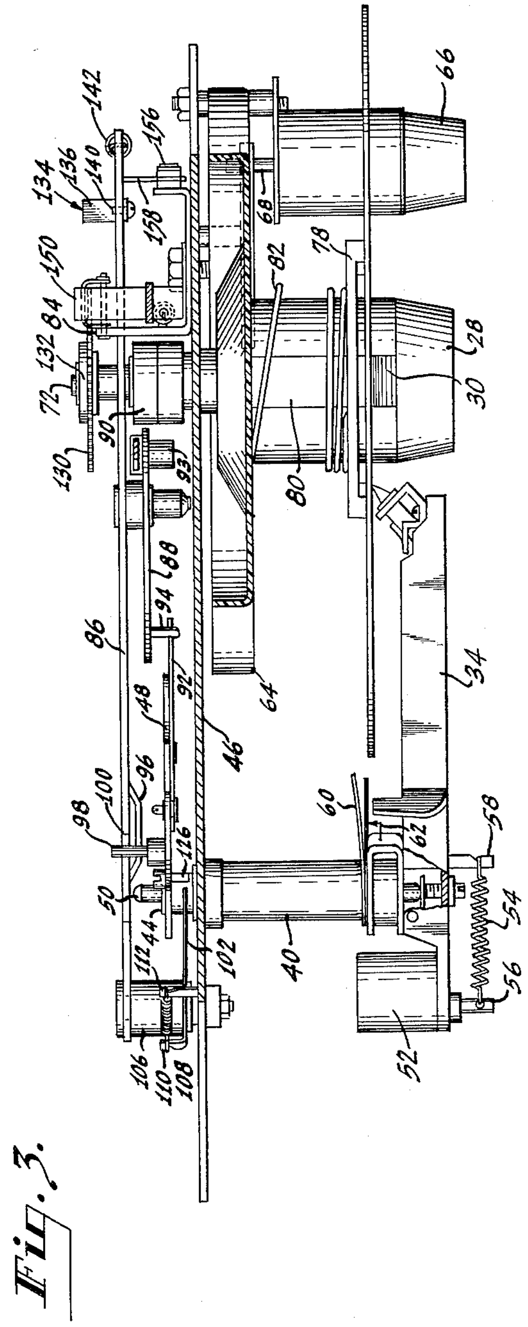
FIGURE 3 is a sectional view taken on the section lines 3—3 of FIGURE 4 of the automatic record playing mechanism of the invention.

A cycling switch 156 which is mounted on the motorboard 46 is controlled by a stud 158 extending from the cycling slide 86. The switch 156 is normally held in the open position by the stud 158 while a record is being played. However, during a record changing cycle when the cycling slide moves to the left as shown in FIGURES 3, 4 and 5, the stud 158 moves away from switch 156 causing the contacts thereof to close.

Figure 10:
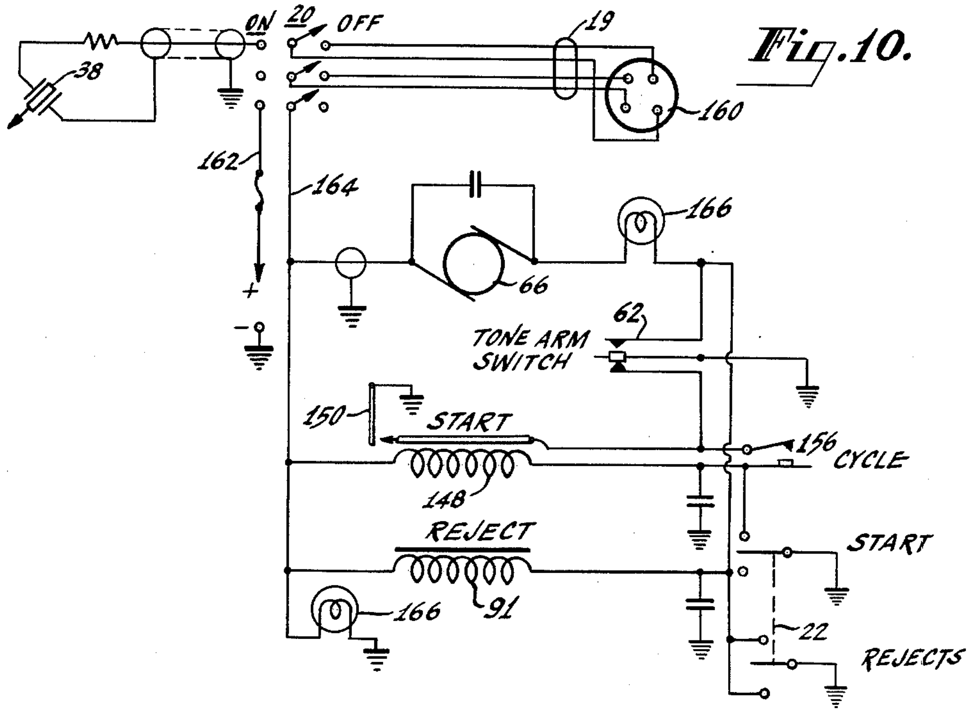
FIGURE 10 is a schematic circuit diagram showing the circuit connections to the various electrical components of the record playing mechanism of the invention.

The operation of the record changer in combination with the electrical circuits thereof will best be understood with reference to FIGURE 10. To condition the system for phonograph operation, the "On-Off" switch 20 is thrown into the "On" position. This permits power to be applied to the record changer driving motor and completes a circuit path for the audio frequency signals transduced by the pickup 38 to the audio frequency amplifier portions of a receiver connected with a plug 160. When the switch 20 is thrown to the "Off" position, the receiver circuits are completed for operation in a known manner.

Figure 4:
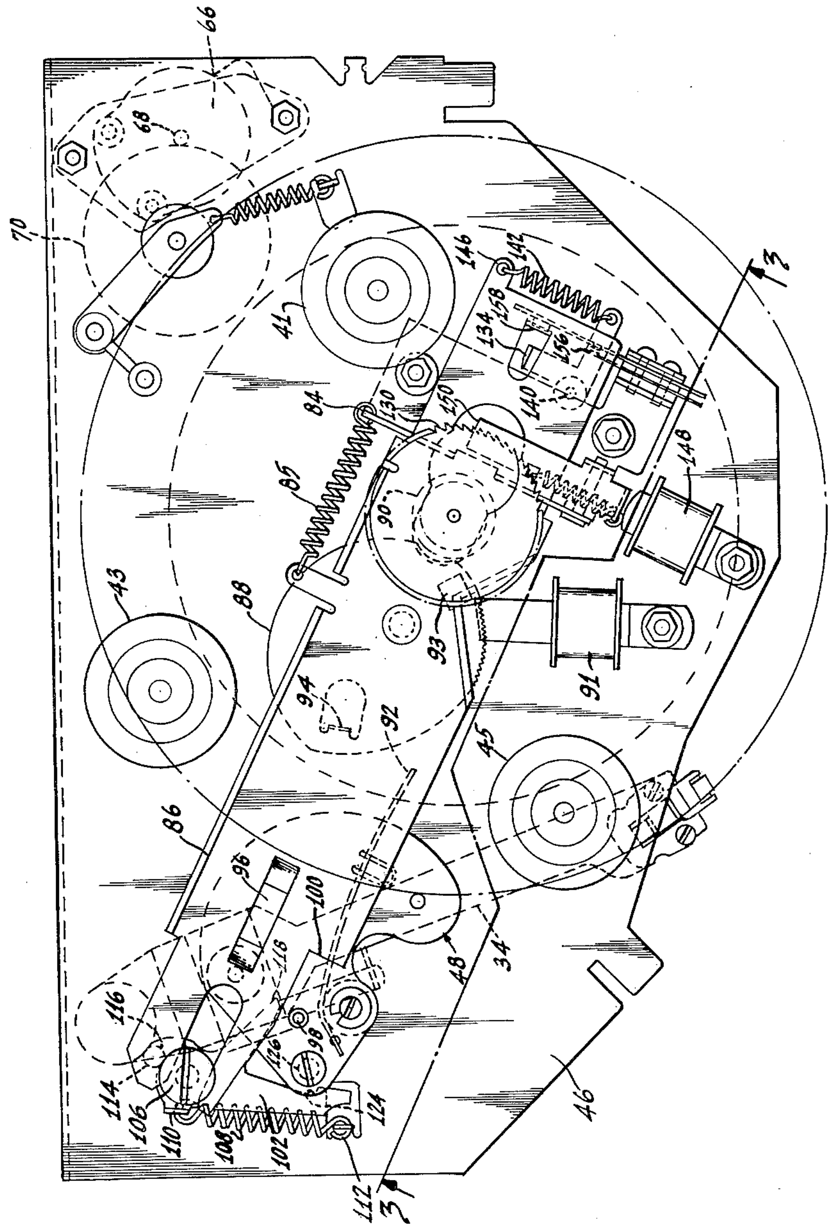
FIGURE 4 is a plan view of an automatic record playing mechanism of the invention showing the positioning of the parts thereof at the start of a record playing cycle.
Figure 5:
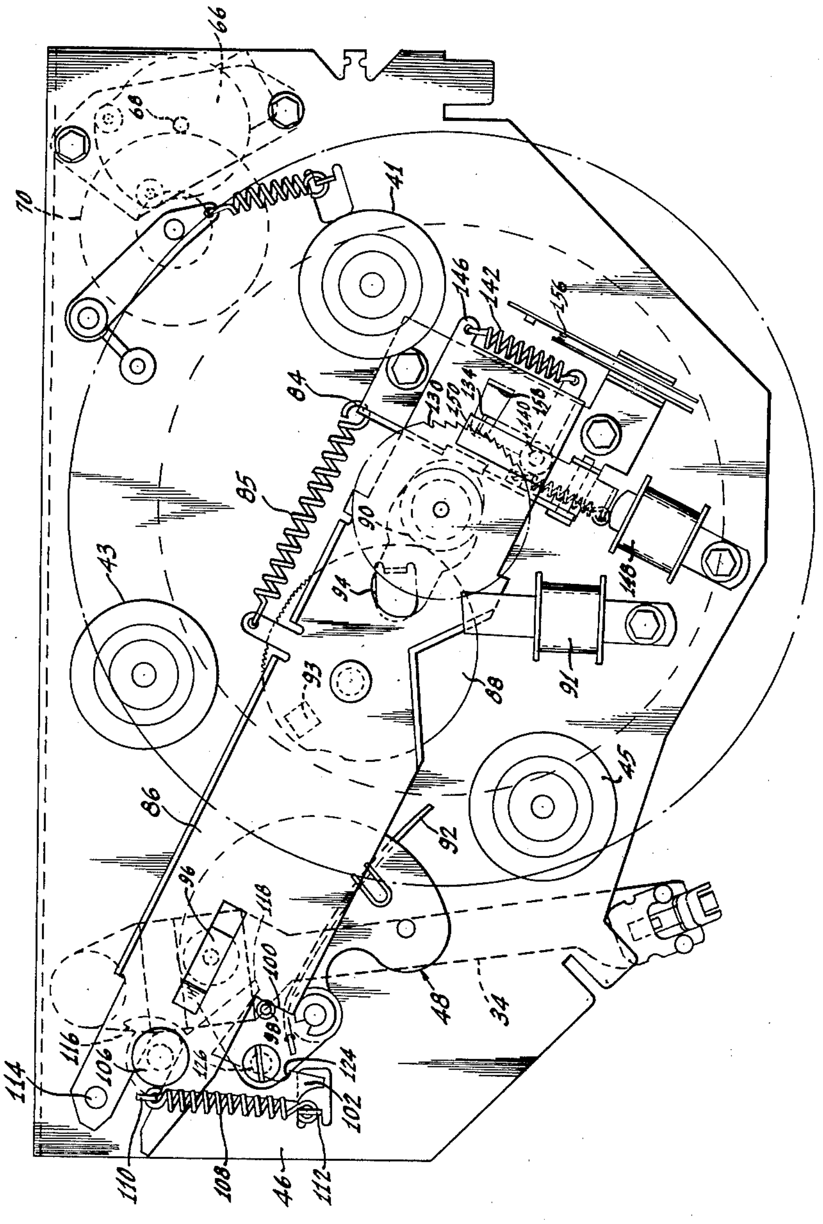
FIGURE 5 is a plan view of the automatic record playing mechanism of the invention showing the positioning of the parts thereof during a normal record changing cycle.

The circuit of FIGURE 10 corresponds to the condition wherein there are no records on the spindle 28, and with the mechanism in the position shown in FIGURE 4. Under these conditions the switches 62 and 156 are both open. Records are first loaded on the spindle 28, and the Start-Reject switch is moved momentarily to the start position. This supplies power to the motor and to the electromagnets 91 and 148. With the motor operating, and the reject relay 91 energized, the mechanism goes into cycle, causing the tone arm to lower and close the switch 62. The motor circuit is then completed through the switch 62, and will remain completed as long as there are records on the spindle 28.

Upon initiation of the cycling operation, the switch 156 closes and the power circuit for the electromagnet 148 is then completed through the switch 156, the electromagnet core, and the lever 150, back to ground. With the electromagnet 148 energized, the lowermost record is prevented from dropping from the spindle. As previously described, the electromagnet 148 causes the lever 158 to move to its alternate position to prevent the detent 134 from engaging the ratchet wheel 130 and stopping the shaft 72. This prevents the record supporting shelves 30 and the record separating blades 42 from operating and causing the lowermost record to be dropped to the receptacle. During the record changing cycle, the switch 156 is closed, causing the circuit for the electromagnet 148 to be completed through the switch 156 and the conductive pole piece for the electromagnet 148 and the lever 158 to ground which is in the present case the motorboard 46. When the cycle has completed, the stud 158 on the control slide opens the switch 156 thereby breaking the electromagnet 148 power circuit.

After the lowermost record has been played, a cycling operation will be automatically initiated to cause that record to be dropped from the spindle 28. To manually reject a record which is being played, the switch 22 is moved to the "Reject" position. This energizes only the electromagnet 91 causing the record changing mechanism to go through a record changing cycle. If desired, a record may be repeated by moving the switch 22 to the "Start" position after the completion of playing of the selected record. This operates to energize both the reject and start electromagnets 91 and 148 so that the record selecting mechanism in the spindle 28 will not be actuated.

After the last record on the spindle 28 has been played and discharged into the receptacle in the cabinet, the switch 62 opens thereby breaking the motor 66 circuit and deenergizing the apparatus.

The circuit of FIGURE 10 also shows a pilot light 166 connected in the motor circuit. The pilot light is physically located in the cabinet 10 so that illumination is provided to assist an operator in loading and removing records from the cabinet. In this regard, it should be noted that the loading and unloading operations may be effected by the use of only one hand without having actually to see the spindle on which the records are to be loaded.

A second pilot light 168 is connected in series with the motor 66 winding to protect that winding against excessive current if the motor is stalled by excessive loading or the like. Under normal operation the pilot light 168 provides negligible illumination and voltage drop. However, when the motor 66 is stalled, the pilot light 168 limits the current therethrough to approximately half the value which would be produced if the full voltage from the battery or the supply were applied directly thereto.

What is claimed is:

1. An automatic record changer spindle of the type which is loaded with records from the lowermost extremity thereof comprising a pair of oppositely disposed record supporting members normally extending from the body of said spindle, a pair of oppositely disposed record separating blades normally retracted within the body of said spindle positioned above said record supporting members, means interconnecting said record separating blades with said record supporting members such that a blade on one side of said spindle is connected with a member on the opposite side of said spindle so that the movement of a blade out of the spindle body causes the opposite member to be retracted, means in said spindle operable to cause said record separating blades to extend from said spindle body whereupon said record supporting members are retracted into the spindle body, and manually operable means in said spindle below said record supporting members for independently retracting said members to release records supported thereon.

2. An automatic record changer spindle of the type which is loaded with records from the lowermost extremity thereof comprising, a spindle body, a pair of record supporting members normally extending from the spindle body, a pair of record separating blades positioned above said record supporting members and normally retracted within the body of said spindle, means in said spindle for causing said record supporting members to retract within said spindle body and for causing said record separating blades to extend from said spindle body, means providing a pair of operating members positioned beneath said record supporting members and each connected to a different one of said members, and manually operable means extending from the bottom of said spindle for causing said pair of operating members to retract said record supporting members independently of said record separating blades so that records supported thereon are released from said spindle.

3. An automatic record changer comprising in combination, means providing a motorboard, a record receiving spindle rotatably supported by and extending downwardly from said motorboard, said spindle being of the type which is loaded with records from the lowermost extremity thereof and comprising a spindle body, a pair of oppositely disposed record supporting members normally extending from the body of said spindle for supporting a stack of records loaded on said spindle, a pair of oppositely disposed record separating blades positioned above the record supporting members and normally retracted within the body of said spindle, means interconnecting the record separating blades with said record supporting members such that a blade on one side of said spindle is connected with the member on the opposite side of said spindle so that the movement of a blade out of the spindle body causes the opposite member to be retracted, means including a member normally rotatable with said spindle which is operable when held against rotation to cause said record separating blades to extend from said spindle body whereupon said record supporting members are retracted into the spindle body, said means including a member extending above said motorboard which is normally rotatable therewith, a tone arm mounted on said motorboard, a record pickup device carried by said tone arm for cooperation with the lower side of the lowermost phonograph record supported on said spindle, means providing automatic record changer mechanism carried by said motorboard above said spindle which is actuable between a normally inoperative condition and an operative condition, said record changer mechanism in the operative condition thereof including an actuating lever which is movable into engagement with said member to hold said normally rotatable means in said spindle against rotation whereupon said record separating blades are caused to extend from said spindle body and said record supporting members are retracted into said spindle body, a blocking lever mounted on said motorboard said blocking lever normally being out of the path of said actuating lever, and means for selectively causing blocking lever to move into the path of said actuating lever to prevent said actuating lever from engaging said normally rotatable member and thereby preventing the extension of said record separating blades and retraction of said record supporting shelves.

References Cited in the file of this patent

UNITED STATES PATENTS

| | | |
|---|---|---|
| 2,628,843 | Comstock | Feb. 17, 1953 |
| 2,682,412 | Carlson | June 29, 1954 |
| 2,777,699 | Woodruff | Jan. 15, 1957 |
| 2,888,267 | Murro | May 26, 1959 |